(12) United States Patent
Waizy et al.

(10) Patent No.: US 10,248,329 B2
(45) Date of Patent: Apr. 2, 2019

(54) METHOD OF IMPROVING ACCESS TO A MAIN MEMORY OF A COMPUTER SYSTEM, A CORRESPONDING COMPUTER SYSTEM AND A COMPUTER PROGRAM PRODUCT

(71) Applicant: Fujitsu Technology Solutions Intellectual Property GmbH, München (DE)

(72) Inventors: Ahmadshah Waizy, Paderborn (DE); Ralf Liesegang, Paderborn (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 259 days.

(21) Appl. No.: 15/302,614

(22) PCT Filed: Apr. 1, 2015

(86) PCT No.: PCT/EP2015/057250
§ 371 (c)(1),
(2) Date: Oct. 7, 2016

(87) PCT Pub. No.: WO2015/155103
PCT Pub. Date: Oct. 15, 2015

(65) Prior Publication Data
US 2017/0031608 A1 Feb. 2, 2017

(30) Foreign Application Priority Data
Apr. 8, 2014 (DE) .......................... 10 2014 104 980

(51) Int. Cl.
*G06F 15/167* (2006.01)
*G06F 3/06* (2006.01)
(Continued)

(52) U.S. Cl.
CPC ............ *G06F 3/0611* (2013.01); *G06F 3/067* (2013.01); *G06F 3/0659* (2013.01); *G06F 13/1694* (2013.01); *H04L 67/025* (2013.01)

(58) Field of Classification Search
CPC ............... G06F 17/30194; G06F 3/067; G06F 11/2053; G06F 12/00; G06F 13/1694; G06F 17/30221; G06F 17/30312
See application file for complete search history.

(56) References Cited

U.S. PATENT DOCUMENTS 9,037,792 B1 * 5/2015 Ingle .................. G06F 12/0866 711/103
9,800,658 B2 * 10/2017 Jin ...................... H04L 67/1097
(Continued)

FOREIGN PATENT DOCUMENTS

WO 2008/131058 A2 10/2008
WO 2013/016723 A2 1/2013

OTHER PUBLICATIONS

Jeffrey C. Mogul et al., "Operating System Support for NVM+DRAM Hybrid Main Memory," HotOS XII 12th Workshop on Hot Topics in Operating Systems, 2009, https://www.usenix.org/legacy/event/hotos09/tech/full_papers/mogul/mogul.pdf.
(Continued)

*Primary Examiner* — Shean Tokuta
(74) *Attorney, Agent, or Firm* — DLA Piper LLP (US)

(57) ABSTRACT

A method of improving access to a main memory of a computer system includes providing a main memory including at least a first memory of a first memory configuration and a second memory of a second memory configuration, and providing a choice between the first memory and the second memory for access to the main memory, wherein access to the first memory and access to the second memory can be distinguished by the choice depending on the respec-
(Continued)

tive access behavior of the first memory and of the second memory, and the choice is provided by a running application program.

20 Claims, 3 Drawing Sheets

(51) Int. Cl.
*G06F 13/16* (2006.01)
*H04L 29/08* (2006.01)

(56) References Cited

U.S. PATENT DOCUMENTS

| | | | | |
|---|---|---|---|---|
| 2001/0037432 A1* | 11/2001 | Hotta | ................. | G06F 12/0846 711/129 |
| 2007/0070764 A1* | 3/2007 | Miyamoto | ............. | G11C 11/22 365/222 |
| 2007/0147115 A1 | 6/2007 | Lin et al. | | |
| 2007/0245076 A1* | 10/2007 | Chang | ...................... | G06F 1/30 711/112 |
| 2008/0291727 A1 | 11/2008 | Seo et al. | | |
| 2009/0276829 A1* | 11/2009 | Sela | ........................ | G06F 21/10 726/2 |
| 2010/0250793 A1* | 9/2010 | Syu | ........................ | G11C 7/22 710/29 |
| 2012/0030428 A1* | 2/2012 | Yasufuku | ............ | G06F 12/0804 711/122 |
| 2012/0124323 A1* | 5/2012 | Lu | ........................ | G06F 9/4406 711/202 |
| 2013/0086309 A1* | 4/2013 | Lee | ..................... | G06F 12/0246 711/103 |
| 2013/0173987 A1* | 7/2013 | Grube | ..................... | G06F 11/10 714/755 |
| 2013/0198437 A1* | 8/2013 | Omizo | ................ | G06F 12/0246 711/103 |
| 2013/0290662 A1* | 10/2013 | Teal | ......................... | G06F 21/52 711/163 |
| 2014/0026017 A1* | 1/2014 | Grube | ................. | G06F 11/1076 714/770 |
| 2014/0082410 A1* | 3/2014 | Ziakas | .................. | G06F 3/0619 714/6.2 |
| 2014/0201435 A1* | 7/2014 | Dong | .................. | G06F 13/1694 711/105 |
| 2015/0026387 A1* | 1/2015 | Sheredy | .............. | G11C 11/5628 711/103 |
| 2015/0160862 A1* | 6/2015 | Blott | ..................... | G06F 3/0604 711/148 |
| 2015/0356305 A1* | 12/2015 | Volvovski | ........... | G06F 11/1464 713/164 |
| 2016/0378652 A1* | 12/2016 | Takeda | ................ | G06F 12/0897 711/122 |
| 2018/0314320 A1* | 11/2018 | Wu | ........................... | G06F 3/00 |

OTHER PUBLICATIONS

Moinuddin K. Qureshi et al., "Scalable High Performance Main Memory System Using Phase-Change Memory Technology," ISCA '09 Proceedings of the 36$^{th}$ Annual International Symposium on Computer Architecture, 2009, pp. 24-33.

Aleksandar Dragojević et al., "FaRM: Fast Remote Memory," Proceedings of the 11$^{th}$ USENIX Symposium in Networked Systems Design and Implementation (NSDI '14), Apr. 2014, Seattle, WA, USA, https://www.usenix.org/conference/nsdi14/technical-sessions/dragojevi%C4%87.

* cited by examiner

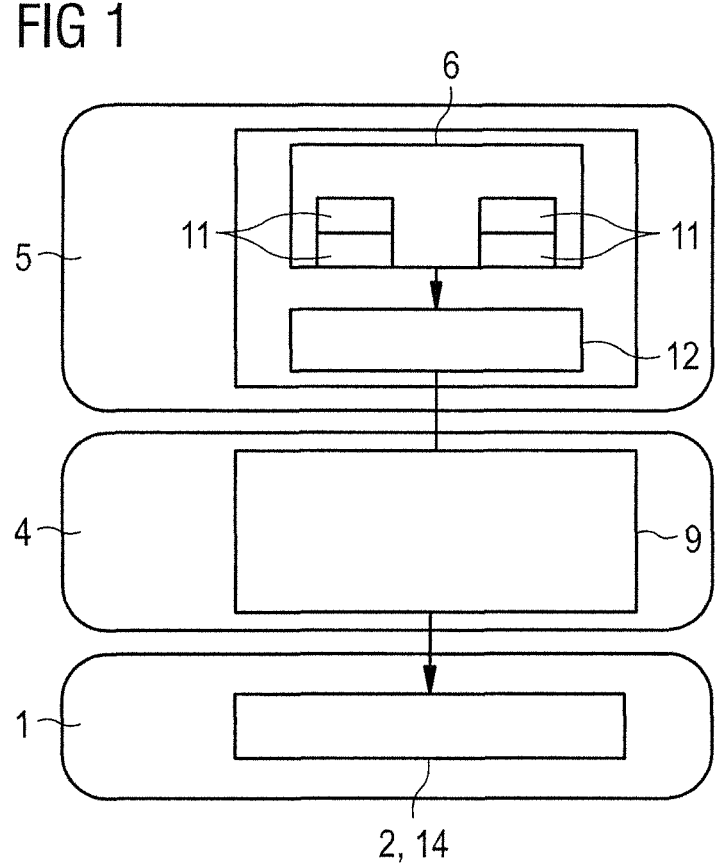

METHOD OF IMPROVING ACCESS TO A MAIN MEMORY OF A COMPUTER SYSTEM, A CORRESPONDING COMPUTER SYSTEM AND A COMPUTER PROGRAM PRODUCT

TECHNICAL FIELD

This disclosure relates to a method of improving access to a main memory of a computer system, a computer system of this type as well as to a computer program product set up to be executed on a corresponding computer system and performs a corresponding method when being executed.

BACKGROUND

One difficulty in computer technology has always been the fact that computer programs require access to a main memory of a computer system upon execution of the programs, which may often lead to a shortage in the main memory. This may result in significant access time delays, manifesting themselves in an (partially significant) expansion of the time period for process completion within a computer system.

Especially in so-called "in-memory computing," i.e., when processing program data purely within the main memory of a computer system, such time delays manifest themselves in database management systems, for example, because huge parts of the database or the entire database is stored in the main memory. The memory space required for the database often significantly exceeds the physically provided memory space.

Known approaches to avoid a shortage in main memory and time delays of the above type provide that program data is distributed across different memory hierarchies. This way, program data can be swapped out of the main memory into a back-up storage, e.g., a hard disk (swap storage).

However, such approaches come with the disadvantage that valuable memory space in the main memory is nevertheless continuously used by running programs so that a time delay or shortage in memory can be counteracted only to a limited extent. This results in time delays during execution of program data, for example, due to the fact that program data need to be moved back and forth between the main memory and a back-up storage (swap storage, system disk or hard disk) by a superordinate memory management unit.

Thus, it could be helpful to improve access to a main memory of a computer system such that a shortage in the main memory and a time delay can be minimized or suppressed in the first place, which leads to a more rapid completion of processes in the computer system.

SUMMARY

We provide a method of improving access to a main memory of a computer system including providing a main memory including at least a first memory of a first memory configuration and a second memory of a second memory configuration, and providing a choice between the first memory and the second memory for access to the main memory, wherein access to the first memory and access to the second memory can be distinguished by the choice depending on the respective access behavior of the first memory and of the second memory, and the choice is provided by a running application program.

We also provide a computer system including a main memory including at least a first memory of a first memory configuration and a second memory of a second memory configuration, wherein a choice between the first memory and the second memory for access to the main memory is set up such that access to the first memory and access to the second memory can be distinguished by the choice depending on the respective access behavior of the first memory and the second memory, and wherein the choice is implemented in an application program.

We further provide a computer program product configured to be executed on a computer system and performs the method of improving access to a main memory of a computer system including providing a main memory including at least a first memory of a first memory configuration and a second memory of a second memory configuration, and providing a choice between the first memory and the second memory for access to the main memory, wherein access to the first memory and access to the second memory can be distinguished by the choice depending on the respective access behavior of the first memory and of the second memory, and the choice is provided by a running application program when being executed.

BRIEF DESCRIPTION OF THE DRAWINGS

FIG. 1 is a schematic illustration of multiple hierarchies in a computer system.

Figure 2A:
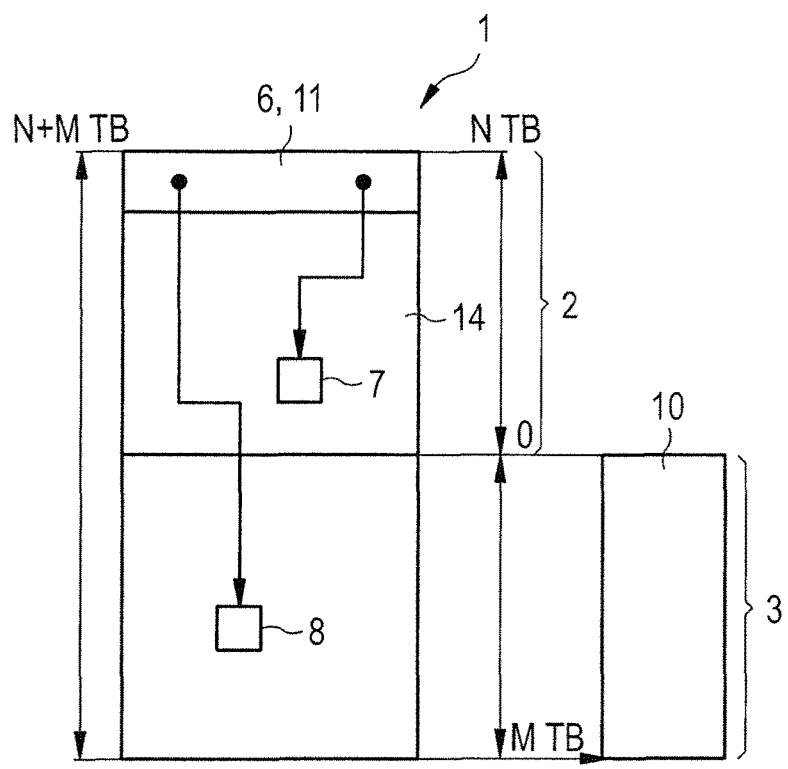
FIG. 2A is a schematic illustration of a first example of a memory architecture.

LIST OF REFERENCE NUMERALS 1 main memory
2 first memory type
3 second memory type
4 operating system layer
5 user layer
6 program
7 data of a first data type
8 data of a second data type
9 memory management unit
10 expanded second memory
11 program data
12 program interface
13a, 13b program interface
14 first memory
15 hard disk storage
16 data of a third data type

DETAILED DESCRIPTION

Our method provides a main memory comprising at least a first memory of a first memory type and a second memory of a second memory type, wherein a choice between the first memory and the second memory is provided for access to the main memory, and wherein access to the first memory and access to the second memory is distinguished by the choices depending on the respective access behavior of the first memory and of the second memory. Advantageously, the choice is provided in the method by a running application program.

The term "application program" relates to any application program that may be run in a computer system on the software layer. The term also includes merely corresponding program parts (so-called "routines") of an application program.

The term "main memory" relates to a short-time memory into which programs or program parts and program data required for the latter two are loaded for and while being executed within a computer system. The main memory is often times also referred to as a working memory. Thus, the main memory significantly differs in its storage hierarchy from other memory or storage levels within a computer system such as hard disk storages or tape drive storages, which compared to the main memory, are used as long-time storage that maintain data.

The term "access behavior" describes intrinsic properties of the storage of the respective type. The respective access behavior of the first storage and the second storage is determined, for example, at least by the following properties:

memory access time,
memory cycle time,
latency time, and
data throughout.

Our method provides the general advantage over conventional approaches that different memory types in the main memory can be selected depending on the requirements. The main memory can be extended or expanded from a first memory type to an additional second memory type, wherein a better capacity utilization of the respective memory depending on intrinsic properties of the respective memory is ensured. Thus, our method provides a combination of an expansion of a main memory in a computer system by a second memory and a choice for access to the respective memory depending on the respective access behavior of the respective memory or storage. This way, a hybrid main memory is provided by the method.

Thus, the choice allows distinguishing in the first place—prior to the use of the respective memory type in the main memory—which type of memory of the main memory is suitable or free for a corresponding process. This prevents that first a conventional main memory is filled with data entirely, even positively stuffed, and only later decision will be taken by a storage management unit, for example, as to whether which data will be left in the main memory for frequent access and which data will be swapped into a swap-file on a back-up storage (swap storage, system disk or hard disk).

Thus, the method of the described type improves access (main memory extension, access time minimization) to a main memory of a computer system by splitting and preparing resources of the main memory to multiple memories of different memory types, wherein access to the corresponding memory is distinguished by the choice prior to use of a corresponding memory.

Due to the choice provided by a running application program, a running application program may select per se between memory types provided by the main memory and address the memory of the main memory suitable for the respective data and respective data types, respectively.

Preferably, at least two program interfaces are provided in the application program in our method. The first memory is addressed via a first program interface, while the second memory is addressed via a second program interface. Thus, a running application program may select, allocate and address different memories of the main memory by the different interfaces, for example, for different access frequencies to respective program data. Different program routines may be called-up to that end, for example.

Preferably, in the method of the type described herein, program data of the application program running in the computer system are stored either in the first memory or in the second memory by the choice depending on the respective access behavior of the first memory and of the second memory and/or depending on the access frequency to the respective program data. A measure of this type provides the advantage that it is possible to distinguish between the access frequency of respective program data.

Program data with a high access frequency are referred to as so-called "hot data," while program data with a medium access frequency are referred to as "warm data" and program data with a low access frequency are referred to as "cold data." Differentiation of memory access depending on the above described access behavior of the respective first or second memory and/or depending on the access frequency to the respective program data enables an improved use of different memory types suitable or adapted for various access frequencies to program data, respectively.

For example, a memory with a low memory access time is suitable for a frequent memory access, while a memory with a longer memory access time is rather suitable for low frequency access. For example, in a database management system, transaction data frequently accessed(hot data) may be stored in a memory of the main memory having a rapid memory access, while data for a conventional table and directory access accessed less often (warm data), respectively, are stored in a memory of the main memory having a higher memory access time.

Due to the differentiation, a memory less suitable for a specific access frequency is not used unnecessarily, but rather with a choice of the more suitable memory will be made by a running application program by the described method.

A detection of the access behavior of the first memory and the second memory or a detection of the access frequency to the respective program data respectively can be performed statically and/or dynamically by a special algorithm when running the application program. For example, certain parameters and/or variables may be handed-over to the application program by an operating system, in an iterative manner if required, the parameters and/or variables reflecting an access behavior of the first memory and the second memory and being correspondingly considered in the program for a selection or choice of the suitable memory. Furthermore, for a selection of the type, even an access frequency to the respective program data can be detected by an operating behavior of the application program, operating system and/or other components of the computer system, in an iterative manner, if required. Advantageously, the processes of detecting the information run in an automated manner in the application program. A decision on the choice of the suitable memory in the application program can be taken based upon the gathered information.

Advantageously, in our method, the first memory is provided as a volatile memory type and the second memory is provided as a non-volatile memory type. For example, the first memory is of the DRAM type (Dynamic Random Access Memory), while the second memory is of the NVRAM memory type (Non-Volatile Random Access Memory). As an alternative, it is also possible to provide the second memory as a volatile memory type as well, e.g., DRAM.

For example, the second memory, in a non-volatile memory of the NVRAM type, may be set up as an SSD memory (solid state drive). Other types of memory are also possible and not excluded by our method. The second memory may be involved as a local storage medium within the computer system or be provided remote via network.

One advantage of setting-up the first and second storages lies with the combination of memory types having different access/storage properties (volatile/non-volatile, access time, costs and the like). As a result, data to be stored in the main memory can be stored either in a volatile or in a non-volatile memory region of the main memory depending on the corresponding properties of the data (e.g., hot/warm/cold data) and depending on the respective access behavior of the first and second memories, respectively. This may be effected depending on respective access times, capacity utilization, provision in terms of memory costs, as so on, for example. As a result, advantages of the described hybrid main memory combined with the described method become apparent even in this aspect.

As an alternative or in addition or the described memory types, at least one memory (e.g., the second memory in place of the NVRAM/SSD type) can be even set up according to the so-called "storage class memory" (SCM) to be used in the future. SCM memories allow combining the advantages of classic short-time (main) memories and the advantages of classic long-time memories.

Preferably, access to the main memory is effected byte per byte or word by word. This way, an advantage of a rapid write/read access time can be combined with the further advantages of the method described herein.

We also provide a computer system comprising a main memory, wherein the main memory comprises at least a first memory of a first memory type and a second memory of a second memory type, wherein a choice between the first memory and the second memory is provided for access to the main memory, such that access to the first memory and access to the second memory may be distinguishable by the choice depending on the respective access behavior of the first memory and the second memory, and wherein the choice is implemented in an application program.

In a computer system of this type, the main memory is extended or expanded respectively, besides a memory of a first memory type by a memory of a second memory type. The choice set-up or implemented in an application program respectively, provides a functionality to select between different memory types in the main memory depending on the request. This way, a better capacity utilization of the main memory depending on intrinsic properties of the respective memory is ensured.

All measures and method steps of the above-described method as well as the advantages and advantageous aspects can also be applied to a computer system of the type described herein and vice versa. That means that the computer system is advantageously set up to provide and perform a method of the above-described type having all advantages and advantageous aspects and method steps and measures, respectively.

We further provide a computer program product which is set-up to be executed on a computer system and perform a method of the described type while being executed.

Further advantageous examples of the described method as well as the described computer system are disclosed below. Our methods, systems and products will be explained by the following multiple drawings.

FIG. 1 shows a schematic illustration of multiple hierarchies within a computer system architecture. The architecture comprises a main memory 1, an operating system layer 4 as well as a user layer 5.

The main memory 1 comprises a memory 14 according to first memory type 2 designed as a DRAM memory, for example. The main memory 1 serves as a working memory that processes program data and other process data within the computer system. Thus, the main memory 1 is basically different from a long-time memory such as hard disk drives or tape disk drives, for example, which are used for long-time storage in computer systems, but are not shown in FIG. 1 for the sake of clarity.

The operating system layer 4 comprises an operating system environment that controls the basic functionality of the computer system and is capable of accessing the main memory 1.

In particular, the operating system layer 4 comprises a memory management unit 9 capable of accessing the main memory 1 to write data into the main memory 1 or read data from the main memory 1 or assign a memory region of the main memory 1 for a memory access (so-called "storage allocation") to predetermined programs in the computer system, for example. The operating system layer 4 may be designed on a pure software basis or include a combination of software and hardware components. For example, the operating system layer 4 may comprise operating system software. The memory management unit 9 may be designed on a software basis or be designed correspondingly as a mix of hardware and software.

A program 6 that processes program data as a running program and realizes predetermined applications as an application program can be found in a user layer 5, which is shown as the uppermost layer in FIG. 1. To that end, program data 11 are present in program 6, or program data 11 are generated in the program 6 while running the program respectively, which can be handed over via a program interface 12 to the main memory 1, specifically the first memory 14 according to the first memory type 2, by the memory management unit 9 of the operating system layer 4.

By the program interface 12, the program 6 may thus use a certain memory region in the main memory 1 to store program data 11 via the memory management unit 9, for example, wherein the respective/corresponding memory region was reserved (allocated) in advance either via the program 6 per se or via the memory management unit 9 of the operating system layer 4.

Thus, in the architecture according to FIG. 1, a program 6 (or multiple running programs 6 not shown in FIG. 1 for the sake of clarity) basically strive to being capable of utilizing as much memory as possible in the main memory 1 per se. It may be true that in operation of the computer system, almost all memory of the main memory 1 is occupied by corresponding program data 11 so that a shortage of memory resources results in the main memory 1. Other programs that also intend to access the memory resources of the main memory 1 are either blocked or may use memory of the main memory 1 only when other data from the main memory 1 has been removed (for example, by swapping them into a special partition or a back-up storage, so called "swap storage").

Thus, in an architecture according to FIG. 1, an access time delay and a memory shortage may result on the main memory 1, manifesting themselves in a poor performance of the computer system.

To solve such disadvantages, a schematic first example of a main memory 1 according to FIG. 2A extends and expands the main memory 1 besides a memory 14 of a first memory type 2 by a second memory 10 of a second memory type 3. That means that the main memory 1 according to FIG. 2A is supplemented by an extended memory 10 compared to the main memory 1 according to an architecture of FIG. 1 so that a program 6 or program data 11 of a running program 6 may access both the first memory 14 of the first memory type 2 and the second extended memory 10 of the second memory type 3, respectively.

To that end, a choice is implemented in program 6 to store program data 11 of a first data type 7 in the memory 14 of the first memory type 2 or to store program data 11 of a second data type 8 in the second memory 10 of the second memory type 3. Thus, by the choice, a program 6 may decide in advance which memory 2, 14 or 3, 10, respectively, of the main memory 1 it intends to access. In particular, the choice is effected depending on access properties of the memory 10, 14 of the first memory type 2 and of the second memory type 3. Such access properties are advantageously determined by the memory access time, memory cycle time, latency time or by the data throughput. Further intrinsic properties of memories 2 and 3 may also be considered.

For example, program data 11 of the first data type 7 may include data with a high access frequency (so-called "hot data"), wherein the first memory 14 of the first memory type 2 is advantageously designed to be a fast memory having a short access time.

Program data 11 of the second data type 8 can be program data having a low access frequency (warm data), for example, advantageously stored in the extended memory 10 of the second memory type 3 by the program 6. The extended memory 10 may thus be a slower memory having a longer access time compared to the first memory 14.

This way, a program 6 may decide depending on the access properties of the respective memories 2, 14 and 3, 10 or depending on the data types 7 and 8 of the program data 11 (e.g., depending on the access frequency to program data 11), respectively, which of the different memory types 2, 14 and 3, 10 of the main memory 1 is to be used. This enables a preselection of suitable memory types for suitable data types of the program data 11 by a program 6 so that a respective memory of a respective memory type 2 and 3 of the main memory 1 is not unnecessarily occupied by program data 11, which may be stored in another place in a more suitable way, i.e., in a memory region of another memory type of the main memory 1. This does not only allow an expansion or extension of the main memory 1, but also a better capacity utilization depending on intrinsic properties of the respective memory of the respective memory type 2 or 3.

Thus, according to FIG. 2A, two different memories 10, 14 for different data types 7, 8 can be distinguished. A fast memory 14 having short access time for as first data type 7 and a slower memory 10 having a longer access time (compared to the fast memory) for a second data type 8. This achieves a hybrid main memory 1.

For example, the first memory 14 of the first memory type 2 may be designed as a DRAM memory, while the extended memory 10 of the second memory type 3 is designed as a non-volatile memory, for example, a NVRAM memory. The NVRAM memory may be designed as a solid state drive memory. It is possible to implement the SSD memory locally in the computer system or remote on a computer system available via network so that the memory may be accessed via network (remote). As an alternative or in addition, it is also possible to access the local main memory 1 from one or multiple remote servers (remote access) in a reversed manner.

It is also possible to provide a memory of a memory type according to the Storage Class Memory (SCM).

According to FIG. 2A, the first memory 14 of the first memory type 2 has a size of N terabytes, while the extended memory 10 of the second memory type 3 has a size of M terabytes. All in all, the main memory 1 thus has a size of N+M terabytes visible for a program 6. This is schematically illustrated in FIG. 2A. Thus, the main memory 1 is set-up as a hybrid main memory.

Architecture according to FIG. 2A provides two advantages, inter alia. A first advantage lies with the fact that a main memory 1 can be extended or expanded to a total memory of N+M terabytes by a first memory 14 of a first memory type 2 with N terabytes by M terabytes of an extended memory 10 of a second memory type 3. The second advantage lies with the fact that in addition a program has a choice to store data either in the first memory 14 or in the second memory 10 depending on the data type and depending on the intrinsic access properties of the respective memory.

Figure 2B:
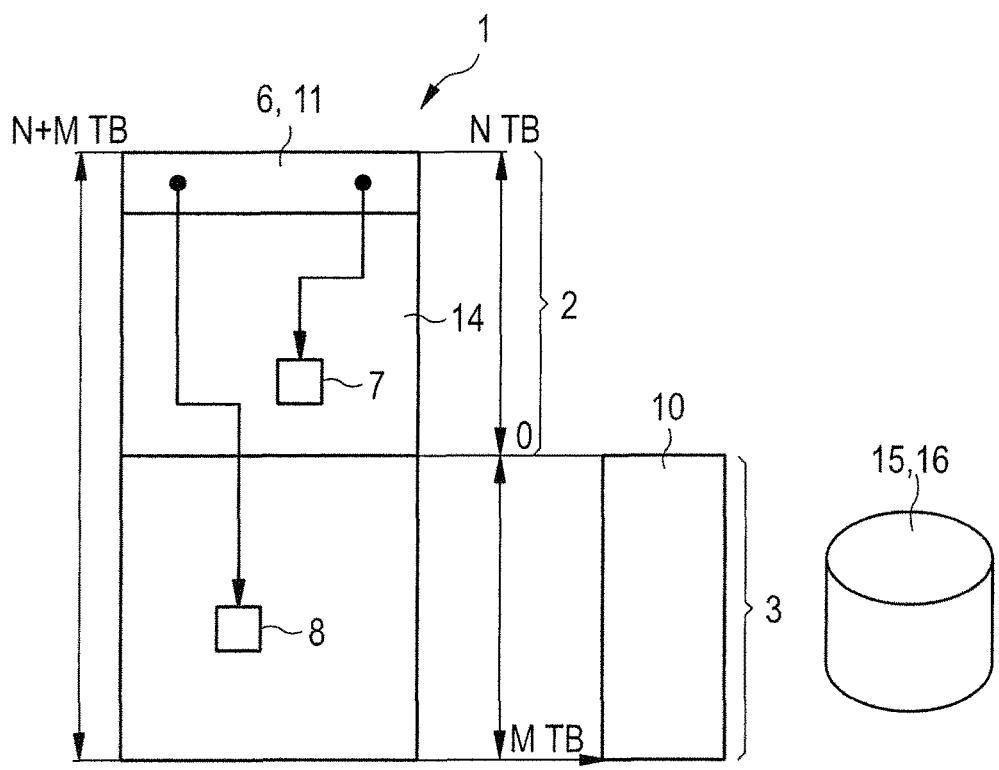
FIG. 2B is a schematic illustration of a second example of a memory architecture.

FIG. 2B shows a schematic illustration of a second possible example of a storage architecture. The main memory 1 has a similar structure to that one shown in FIG. 2A. However, in contrast to the architecture in FIG. 2A, a hard disk drive 15 is additionally provided in FIG. 2B, on which program data of a third data type 16 can be stored, e.g., having a lower access frequency (cold data) compared to the above data types 7 and 8. The hard disk drive storage 15 has a longer access time compared over the memories 2, 14 and 3, 10. A program 6 may advantageously also access the hard disk drive 15, which is not shown, however, for the sakes of clarity.

Thus, according to FIG. 2B, three different types of memories 10, 14, 15 may be distinguished for different data types 7, 8, 16. A fast memory 14 having a short access time for a first data type 7, a medium memory 10 having a medium access time for a second data type 8, as well as a slow memory 15 having a long access time for a third data type 16. The memories 10 and 14 are incorporated as hybrid main memory 1 (just like in FIG. 2A).

Figure 2C:
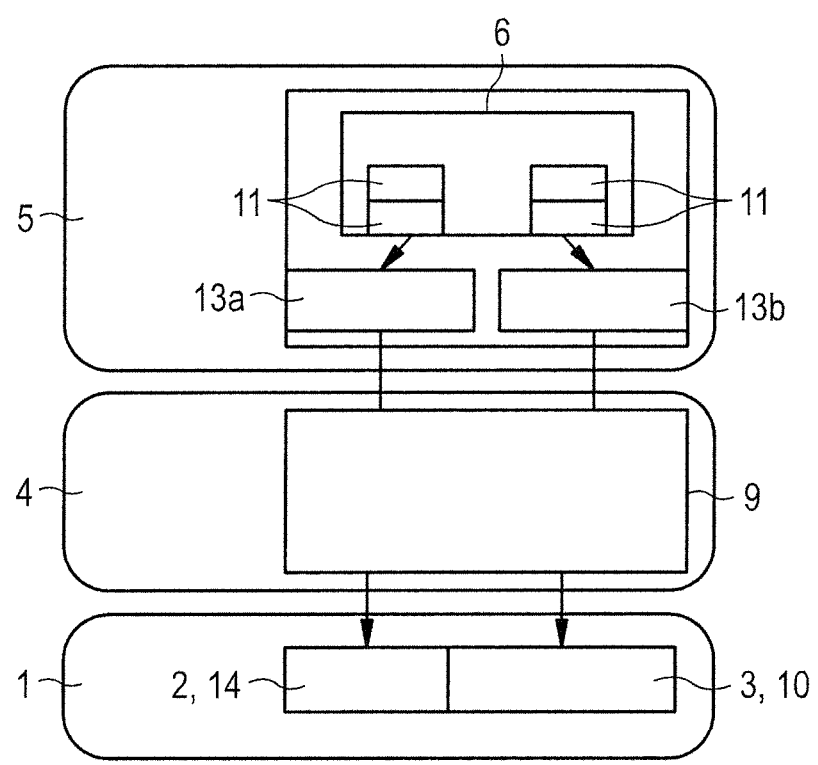
FIG. 2C is a schematic illustration of multiple hierarchies in a computer system that performs our methods.

FIG. 2C shows a schematic illustration of architecture in a computer system, wherein, similar to FIG. 1, a main memory 1, an operating system layer 4 as well as a user layer 5 is set-up.

According to the architectures of FIGS. 2A and 2B, the main memory 1 comprises a first memory 14 of a first memory type 2 and a second, extendable memory 10 of a second memory type 3.

As already mentioned in conjunction with FIG. 1, a running application program 6 is provided on the user layer 5, which can access the main memory 1, specifically either the first memory 14 of the first memory type 2 or the extended memory 10 of the second memory type 3 by the operating system layer 4, particularly by a memory management unit 9 on the operating system layer 4.

For a corresponding access and as a choice for the program 6, two program interfaces, a first interface 13a and a second interface 13b, are provided in the program 6. For example, program 6 may address the first memory 14 of the first memory type 2 via the first program interface 13a, while the program 6 may address the extended memory 10 of the second memory type 3 in the main memory 1 via the program interface 13b.The Program interfaces 13a and 13b may also include program interfaces for allocating or instructing allocation of a respective memory besides the storage commands, respectively. For example, program interface 13a may be a routine "m1alloc( )," while program interface 13b comprises a routine "m2alloc( )." This way, different memories 14, 10 of a first and second type 2, 3 can be addressed by different allocation commands for a respective access for storing different data types.

As already explained in conjunction with FIG. 2A, program 6 of FIG. 2C may store program data 11 either in the first memory 14 of the first memory type 2 or in the extended memory 10 of the second memory type 3 depending on their access frequency and/or depending on the access behavior of the respective memory by the program interfaces 13a and 13b and, if required, by the memory management unit 9.

It is also possible to store program data 11 in a hard disk drive 15 according to FIG. 2B. However, this is not shown for the sake of clarity.

By an algorithm advantageously implemented in program 6, the algorithm running in an automated manner, the program 6 may detect information about the access behavior of the different memories 14, 10 and possibly 15 and/or information about the access frequency to the respective program data 11. This can be effected in a static or dynamic manner. A decision on the choice of the suitable memory may be made based upon the gathered information in the application program.

The drawings according to FIGS. 1, 2A, 2B and 2C are merely examples of possible architectures of the described computer system or possible processes of the described method.

The invention claimed is:

1. A method of improving access to a main memory of a computer system comprising:
   providing a main memory comprising at least a first memory of a first memory configuration and a second memory of a second memory configuration, and
   providing a choice between the first memory and the second memory for access to the main memory,
   wherein access to the first memory and access to the second memory can be distinguished by the choice depending on the respective access behavior of the first memory and of the second memory,
   the choice is implemented in a running application program, in a user layer of a hierarchical computer system architecture, the user layer being different from an operating system layer of the hierarchical computer system architecture, and
   the application program by the choice decides in advance which of the first memory or the second memory of the main memory it intends to access.

2. The method according to claim 1, wherein at least two program interfaces are provided in the application program and the first memory is addressed via the first program interface and the second memory is addressed via the second program interface.

3. The method according to claim 1, wherein program data of the application program running in the computer system are stored either in the first memory or in the second memory by the choice depending on the respective access behavior of the first memory and the second memory or depending on the access frequency of the respective program data.

4. The method according to claim 1, wherein the respective access behavior of the first memory and the second memory is determined at least by the following properties:
   memory access time,
   memory cycle time,
   latency time, and
   data throughput.

5. The method according to claim 1, wherein the first memory is provided as a volatile memory and the second memory is provided as a volatile or non-volatile memory.

6. The method according to claim 1, wherein the second memory is provided as a remote memory via network by one or multiple remote computer systems.

7. The method according to claim 1, wherein access to the main memory is effected byte by byte or word by word.

8. A computer system comprising: a main memory comprising at least a first memory of a first memory configuration and a second memory of a second memory configuration,
   wherein a choice between the first memory and the second memory for access to the main memory is set up such that access to the first memory and access to the second memory can be distinguished by the choice depending on the respective access behavior of the first memory and the second memory,
   the choice is implemented in an application program in a user layer of a hierarchical computer system architecture, the user layer being different from an operating system layer of the hierarchical computer system architecture, and
   the application program is configured to decide in advance by the choice which of the first memory or the second memory of the main memory it intends to access.

9. The computer system according to claim 8, wherein at least two program interfaces are implemented in the application program for access to the main memory and the first memory is addressable via the first program interface and the second memory is addressable via the second program interface.

10. The computer system according to claim 8, configured to perform a method comprising:
    providing a main memory comprising at least a first memory of a first memory configuration and a second memory of a second memory configuration, and
    providing a choice between the first memory and the second memory for access to the main memory,
    wherein access to the first memory and access to the second memory can be distinguished by the choice depending on the respective access behavior of the first memory and of the second memory, and
    the choice is provided by a running application program.

11. A computer program product configured to be executed on a computer system and performs a method according to claim 1 when being executed.

12. The computer system according to claim 9, configured to perform a method comprising:
    providing a main memory comprising at least a first memory of a first memory configuration and a second memory of a second memory configuration, and
    providing a choice between the first memory and the second memory for access to the main memory,
    wherein access to the first memory and access to the second memory can be distinguished by the choice depending on the respective access behavior of the first memory and of the second memory, and
    the choice is provided by a running application program.

13. The method according to claim 2, wherein program data of the application program running in the computer system are stored either in the first memory or in the second memory by the choice depending on the respective access behavior of the first memory and the second memory or depending on the access frequency of the respective program data.

14. The method according to claim 2, wherein the respective access behavior of the first memory and the second memory is determined at least by the following properties:

memory access time,
memory cycle time,
latency time, and
data throughput.

15. The method according to claim 3, wherein the respective access behavior of the first memory and the second memory is determined at least by the following properties:
memory access time,
memory cycle time,
latency time, and
data throughput.

16. The method according to claim 2, wherein the first memory is provided as a volatile memory and the second memory is provided as a volatile or non-volatile memory.

17. The method according to claim 3, wherein the first memory is provided as a volatile memory and the second memory is provided as a volatile or non-volatile memory.

18. The method according to claim 4, wherein the first memory is provided as a volatile memory and the second memory is provided as a volatile or non-volatile memory.

19. The method according to claim 2, wherein the second memory is provided as a remote memory via network by one or multiple remote computer systems.

20. The method according to claim 3, wherein the second memory is provided as a remote memory via network by one or multiple remote computer systems.

* * * * *